(12) United States Patent
Uozumi et al.

(10) Patent No.: US 12,351,280 B2
(45) Date of Patent: Jul. 8, 2025

(54) SMALL PLANING WATERCRAFT AND METHOD OF CONTROLLING SMALL PLANING WATERCRAFT

(71) Applicant: Kawasaki Jukogyo Kabushiki Kaisha, Kobe (JP)

(72) Inventors: Yoshinobu Uozumi, Kobe (JP); Masaaki Miyoshi, Kobe (JP); Kazuki Ueda, Kobe (JP)

(73) Assignee: Kawasaki Motors, Ltd., Hyogo (JP)

( * ) Notice: Subject to any disclaimer, the term of this patent is extended or adjusted under 35 U.S.C. 154(b) by 397 days.

(21) Appl. No.: 17/449,110

(22) Filed: Sep. 28, 2021

(65) Prior Publication Data

US 2023/0097457 A1    Mar. 30, 2023

(51) Int. Cl.
| | | |
|---|---|---|
| *B63B 34/10* | (2020.01) | |
| *B63B 79/40* | (2020.01) | |
| *B63H 21/20* | (2006.01) | |
| *B63H 21/21* | (2006.01) | |
| *H02J 7/00* | (2006.01) | |
| *H02J 7/14* | (2006.01) | |
| *B63J 3/00* | (2006.01) | |

(52) U.S. Cl.
CPC ............ *B63B 34/10* (2020.02); *B63B 79/40* (2020.01); *B63H 21/20* (2013.01); *B63H 21/21* (2013.01); *H02J 7/00712* (2020.01); *H02J 7/14* (2013.01); *B63H 2021/202* (2013.01); *B63H 2021/216* (2013.01); *B63J 2003/002* (2013.01)

(58) Field of Classification Search
None
See application file for complete search history.

(56) References Cited

U.S. PATENT DOCUMENTS

| | | | |
|---|---|---|---|
| 6,652,330 B1 * | 11/2003 | Wasilewski | H02J 1/14 440/2 |
| 7,218,118 B1 * | 5/2007 | Gonring | G01R 31/3647 320/132 |
| 2013/0094665 A1 * | 4/2013 | Muench | H03F 3/181 381/98 |
| 2019/0061894 A1 * | 2/2019 | Araki | F02D 11/02 |
| 2020/0062354 A1 | 2/2020 | Araki et al. | |
| 2020/0198561 A1 * | 6/2020 | Weed | B60P 1/6409 |
| 2021/0070413 A1 * | 3/2021 | Gulliksson | B63H 20/10 |
| 2021/0291945 A1 * | 9/2021 | Iwaki | B63B 79/40 |
| 2022/0009605 A1 * | 1/2022 | Ledden | H02J 3/003 |

(Continued)

Primary Examiner — Jelani A Smith
Assistant Examiner — Davin Seol
(74) Attorney, Agent, or Firm — BURR PATENT LAW, PLLC

(57) ABSTRACT

A small planing watercraft includes: a travel electrical component driven for travel of the small planing watercraft; an accessory electrical component provided separately from the travel electrical component; a battery supplying power to the travel electrical component and the accessory electrical component; a sensor detecting a physical quantity corresponding to a level of the battery; and processing circuitry determining, based on a result of detection of the sensor, whether the level of the battery is a predetermined power saving level, and controlling, when it is determined that the level of the battery is the power saving level, operation of the accessory electrical component so that power consumed by the accessory electrical component is less than that before determination.

19 Claims, 8 Drawing Sheets

(56) References Cited

U.S. PATENT DOCUMENTS

| | | | |
|---|---|---|---|
| 2022/0014036 A1* | 1/2022 | Gonring | B63H 21/20 |
| 2022/0063526 A1* | 3/2022 | Ledden | H02J 7/0063 |
| 2022/0073179 A1* | 3/2022 | Hayashi | B63H 21/21 |
| 2023/0054361 A1* | 2/2023 | Kirchhoff | B60L 15/20 |

* cited by examiner

SMALL PLANING WATERCRAFT AND METHOD OF CONTROLLING SMALL PLANING WATERCRAFT

BACKGROUND OF THE INVENTION

Field of the Invention

The present disclosure relates to small planing watercrafts traveling on water.

Description of the Background Art

U.S. Patent Application Laid-Open No. 2020/0062354 discloses a personal watercraft including speakers. As described above, a small planing watercraft sometimes includes an accessory electrical component, such as speakers, not directly affecting travel performance to fulfill a desire of an operator.

SUMMARY

A small planing watercraft according to one aspect includes: a travel electrical component driven for travel of the small planing watercraft; an accessory electrical component provided separately from the travel electrical component; a battery supplying power to the travel electrical component and the accessory electrical component; a sensor detecting a physical quantity corresponding to a level of the battery; and processing circuitry determining, based on a result of detection of the sensor, whether the level of the battery is a predetermined power saving level, and controlling, when it is determined that the level of the battery is the power saving level, operation of the accessory electrical component so that power consumed by the accessory electrical component is less than that before determination.

Operation of the accessory electrical component is thus controlled to reduce power consumed by the accessory electrical component when the level of the battery is the predetermined power saving level. The influence of reduction in level of the battery on travel of the small planing watercraft can thus be suppressed.

A small planing watercraft according to another aspect includes: an accessory electrical component; a battery supplying power to the accessory electrical component; a sensor detecting a physical quantity corresponding to a level of the battery; a notification device providing recognizable information to a person on board of the small planing watercraft; and processing circuitry determining, based on a result of detection of the sensor, whether the level of the battery is a predetermined power saving level and whether the level of the battery is a warning level which is lower than the power saving level and at which operation of a travel electrical component is destabilized, causing the notification device to provide notification when it is determined that the level of the battery is the predetermined power saving level, and causing the notification device to provide notification of the warning level separately from notification of the power saving level when it is determined that the level of the battery is the warning level.

The notification device can thus be caused to provide notification to prompt the person on board to take action to reduce consumption of the battery when the level of the battery becomes the predetermined level during operation of the accessory electrical component. Furthermore, notification of the warning level can be provided separately from notification of the power saving level.

A method of controlling a small planing watercraft according to yet another aspect is a method of controlling a small planing watercraft including a travel electrical component driven for travel of the small planing watercraft, an accessory electrical component provided separately from the travel electrical component, and a battery supplying power to the travel electrical component and the accessory electrical component, the method including: detecting a physical quantity corresponding to a level of the battery; determining, based on a result of detection of the physical quantity corresponding to the level of the battery, whether the level of the battery is a predetermined power saving level; and controlling, when it is determined that the level of the battery is the power saving level, operation of the accessory electrical component so that power consumed by the accessory electrical component is less than that before determination.

Operation of the accessory electrical component is thus controlled to reduce power consumed by the accessory electrical component when the level of the battery is the predetermined power saving level. The influence of reduction in level of the battery on travel of the small planing watercraft can thus be suppressed.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments

A small planing watercraft according to an embodiment will be described below.
<Overall Configuration>

Figure 1:
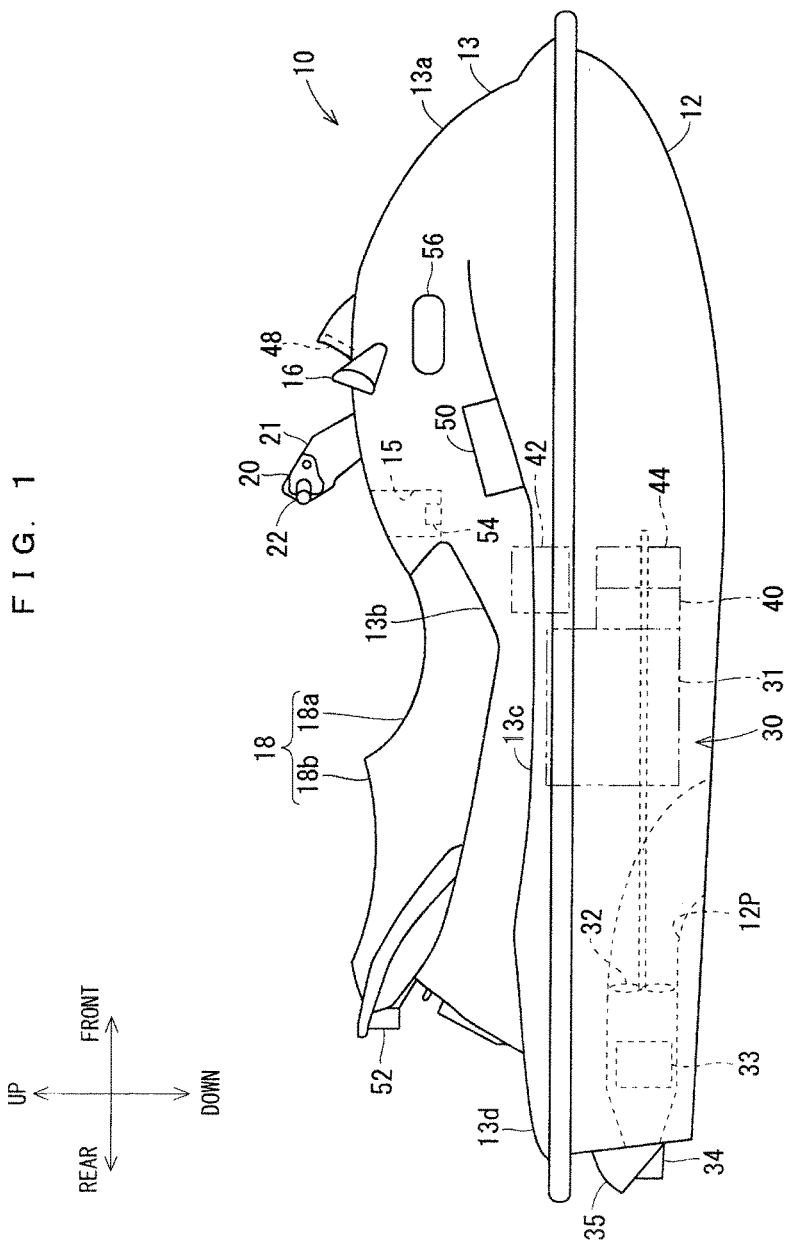
FIG. 1 is a side view illustrating a small planing watercraft.

An overall configuration of a small planing watercraft 10 will be described. FIG. 1 is a side view illustrating the small planing watercraft 10. The small planing watercraft 10 is a boat raised by lift when moving forward, and planing to slide across a water surface. The small planing watercraft 10 may have a size for a single person, two to four people, or five or more people, for example. One example of the small planing watercraft 10 is a personal watercraft (PWC). The small planing watercraft 10 may be a motorboat. An example in which the small planing watercraft 10 is the PWC will be described in the present embodiment.

The small planing watercraft 10 includes a body 12, a deck 13, a seat 18, and a handle device 20. The body 12 is a structure of the small planing watercraft 10 having a space to generate buoyancy in water. For example, the body 12 is a container-like structure closing on a lower side and opening on an upper side. The deck 13 covers an opening on the upper side of the body 12. The seat 18 is disposed on the deck 13. People on board are seated on the seat 18. The handle device 20 is disposed above the body 12 and forward of the seat 18. From among the people on board, an operator operates the handle device 20 in a state of being seated on the seat 18. With reference to a posture of the operator operating the small planing watercraft 10 in a planing state, a side forward of the operator is a front side, and a side rearward of the operator is a rear side. A left side and a right side are determined with reference to a state of the operator facing forward. A side of the body 12 is a lower side, and a side of the deck 13 is an upper side.

The deck 13 includes a front 13a, a central protrusion 13b, side floors 13c, and a rear floor 13d. The front 13a covers a front portion of the opening on the upper side of the body 12. The front 13a is curved to be convex. A rear end of the front 13a is located above a front end of the front 13a, and the center along the width of the front 13a is located above opposite ends along the width of the front 13a. The central protrusion 13b extends rearward from the center along the width of the rear end of the front 13a. The central protrusion 13b has a smaller width than the deck 13. The side floors 13c extend outward along the width of the central protrusion 13b. A rear end of the central protrusion 13b is located forward of a rear end of the deck 13. The rear floor 13d extends behind the central protrusion 13b of the deck 13. The central protrusion 13b protrudes above the side floors 13c and the rear floor 13d.

The seat 18 is supported by an upper portion of the central protrusion 13b. The people on board are seated on the seat 18 to straddle the seat 18. The seat 18 is longer in a fore-aft direction, for example. The seat 18 includes a seat front portion 18a and a seat rear portion 18b located rearward of the seat front portion 18a, for example. The seat front portion 18a is lower than the seat rear portion 18b. From among the people on board, the operator is seated on the seat front portion 18a, and a passenger is seated on the seat rear portion 18b.

The small planing watercraft 10 includes a propulsion device 30. The propulsion device 30 is a device for propelling the small planing watercraft 10. The propulsion device 30 includes a travel drive source 31, an impeller 32, a stator vane 33, and a nozzle 34, for example.

The travel drive source 31 rotationally drives the impeller 32. The travel drive source 31 is only required to generate propulsion for the small planing watercraft 10. For example, the travel drive source 31 may be an internal combustion engine generating rotary drive force through fuel combustion or an electrical motor generating the rotary drive force using electrical energy. Assume that the travel drive source 31 is the internal combustion engine in the present embodiment. The travel drive source 31 is disposed within the body 12, for example. The body 12 has a water flow path 12P for taking in water outside the body 12 and jetting water rearward. The impeller 32 is disposed within the flow path 12P. The travel drive source 31 rotationally drives the impeller 32 to allow water within the flow path 12P to flow rearward of the impeller 32. The stator vane 33 is disposed rearward of the impeller 32 within the flow path 12P. A swirling flow behind the impeller 32 is rectified by the stator vane 33, and is allowed to flow further rearward. The nozzle 34 is disposed at a rear end of the flow path 12P. Water flowing from the impeller 32 through the stator vane 33 is compressed by the nozzle 34, and jetted rearward of the body 12. Forward propulsion for the small planing watercraft 10 can thus be obtained.

The small planing watercraft 10 may include a propulsion stop mechanism stopping propulsion even when an engine is running. The small planing watercraft 10 may include, as the propulsion stop mechanism, a reverse bucket 35 located rearward of an outlet of the nozzle 34. The reverse bucket 35 changes a direction of a jet of at least portion of a flow of water produced by rotation of the impeller 32. Propulsion for the small planing watercraft 10 can thus be stopped even when the engine is running.

For example, the reverse bucket 35 is supported by the body 12 to be movable between a retracted position where the reverse bucket 35 is retracted from a position rearward of the outlet of the nozzle 34 and a reverse position where the reverse bucket 35 covers at least portion of the outlet from behind. The reverse bucket 35 may be moved by driving of an actuator, such as a hydraulic cylinder, for example. When the reverse bucket 35 is at the retracted position, water jetted from the outlet flows rearward as it is. The small planing watercraft 10 thus moves forward. When the reverse bucket 35 is at the reverse position, water jetted from the outlet flows forward. The small planing watercraft 10 thus moves rearward. When the reverse bucket 35 is at a neutral position between the retracted position and the reverse position, a portion of water jetted from the outlet flows rearward, and the other portion of water jetted from the outlet flows forward. Flows in the fore-aft direction match each other, so that the small planing watercraft 10 is stopped. The above-mentioned reverse bucket 35 may be omitted.

The propulsion device of the small planing watercraft 10 is not limited to that in the above-mentioned example. For example, the small planing watercraft 10 may be propelled by rotating a screw outside the body 12.

The small planing watercraft 10 includes a starter motor 40. The starter motor 40 assists in initiating startup of the travel drive source 31 as the internal combustion engine. The starter motor 40 is an electrical motor, for example. Rotation of the starter motor 40 is transferred to a crankshaft of the internal combustion engine directly or through a gear. The starter motor 40 rotates the crankshaft of the internal combustion engine until a combustion cycle of the internal combustion engine is established.

The small planing watercraft 10 includes a battery 42. The battery 42 is chargeable, and supplies power to an electrical component mounted on the small planing watercraft 10.

The small planing watercraft 10 may include a generator 44. The generator 44 receives a portion of power generated by the travel drive source 31 as the internal combustion engine, and generates power to charge the battery 42. The generator 44 is referred to as an alternator, for example. Rotation of the shaft rotationally driven by the travel drive source 31 is directly or indirectly transferred to the generator 44. The generator 44 generates power by rotational motion transferred from the travel drive source 31. An alternating current obtained by the generator 44 is rectified into a direct current, and is supplied to the battery 42 to charge the battery 42. Power of the battery 42 may directly be supplied to the electrical component mounted on the small planing watercraft 10. The generator 44 may be omitted.

The handle device 20 includes a columnar part 21 extending upward from the deck 13 and left and right handle grips 22 extending both to the left and to the right from an upper end portion of the columnar part 21. The operator can operate the small planing watercraft 10 while grasping the left and right handle grips 22 in a state of being seated on the seat front portion 18a.

The small planing watercraft 10 includes left and right auxiliary mirrors 16. The left and right auxiliary mirrors 16 are disposed forward of the seat 18. For example, the left and right auxiliary mirrors 16 protrude outward along the width of the front 13a at a position forward of the left and right handle grips 22. The operator seated on the seat 18 can see a rearward range reflected in reflecting surfaces of the auxiliary mirrors 16 by viewing the reflecting surfaces while facing forward. One or both of the auxiliary mirrors 16 may be omitted.

The small planing watercraft 10 includes a display device 48. The display device 48 is disposed forward of the seat 18. The display device 48 is located to be recognizable by the operator seated on the seat front portion 18a while grasping the pair of handle grips 22, for example. For example, the display device 48 is attached to the front 13a to be located forward of the handle device 20 and at the center along the width of the deck 13. The display device 48 may be attached to the handle device 20. The display device 48 may be omitted. Examples of the display device 48 include a liquid crystal display and an organic electro-luminescence (EL) display. The display device 48 displays visual information for the people on board including the operator. The operator can acquire the visual information displayed by the display device 48 by viewing the display device 48 while operating the small planing watercraft 10.

The small planing watercraft 10 includes an accessory electrical component provided separately from a travel electrical component. The travel electrical component is herein an electrical part having a role for travel on water of the small planing watercraft 10, for example. For example, the travel electrical component may be grasped as an electrical part essential not to make travel on water of the small planing watercraft 10 difficult. For example, due to driving of the starter motor 40, startup of the travel drive source 31 as the internal combustion engine is initiated to allow for travel of the small planing watercraft 10. The starter motor 40 is thus one example of the travel electrical component driven for travel of the small planing watercraft 10. A control device controlling the battery 42, the generator 44, and the travel drive source 31 for the small planing watercraft 10 described above and an internal combustion engine including an electromagnetic valve controlled by the control device are also examples of the travel electrical component. In addition to the starter motor, an ignition plug, a throttle valve actuator, a crank angle sensor, a throttle valve position sensor, a manifold pressure sensor, an intake temperature sensor, a fuel level sensor, an engine temperature detection sensor, a watercraft speed sensor, and an engine drive electrical component, such as an engine control device, driving the engine are considered as examples of the travel electrical component. A throttle command sensor detecting throttle operation, a bucket command sensor detecting reverse bucket operation, and a user interface relating to travel operation, such as a gauge displaying a state of the engine, are also considered as examples of the travel electrical component.

In contrast, the accessory electrical component is an electrical part not directly affecting travel on water of the small planing watercraft 10. For example, the accessory electrical component may be grasped as an electrical part inessential for travel on water of the small planing watercraft 10. The accessory electrical component may also be grasped as an electrical part to which power supply can be stopped during travel on water when the small planing watercraft 10 is travelling on water, for example. The small planing watercraft 10 may include one or more accessory electrical components.

The display device 48 can be a travel electrical component or an accessory electrical component depending on display content. In a case where the display device 48 displays main information for travel on water for the operator, for example, the display device 48 is the travel electrical component. Examples of the main information for travel on water include speed information and information on forward or rearward movement. In a case where the display device 48 displays associated information for travel on water or information not relating to travel on water for the operator, for example, the display device 48 is the accessory electrical component. Examples of the associated information for travel on water and the information not directly relating to travel on water include a total travel distance and time.

Power is supplied from the battery 42 to the travel electrical component and the accessory electrical component described above.

The small planing watercraft 10 includes speakers 50, an imaging camera 52, a USB charging connector 54, and lighting devices 56 as accessory devices, for example. In addition, an audio amplifier, a wireless transceiver complying with the Bluetooth® standard, a music player, a radio, a fish finder, a power supply to accessories, a GPS sensor, and the like are considered as the accessory devices.

The speakers 50 are devices converting sound electrical signals into sound. For example, the small planing watercraft 10 includes the music player, and the sound electrical signals from the music player are amplified by the audio amplifier, and output to the speakers 50. In FIG. 1, an example in which left and right speakers 50 are located outward of the handle device 20 on the deck 13 is illustrated. The small planing watercraft 10 may include a single speaker 50 or three or more speakers 50. Installation positions of the speakers 50 are not limited to those in the above-mentioned example, and may be any installation positions. A mobile terminal device, such as a smartphone, may be used as the music player, for example. In this case, voice signals wirelessly transmitted from the mobile terminal device may be output to the speakers through the wireless transceiver.

The imaging camera 52 is a device capturing an image of scenery around the small planing watercraft 10. The imaging camera 52 may be located in a rear portion of the central protrusion 13b, and may capture an image behind the small planing watercraft 10, for example. The image captured by the imaging camera 52 may be displayed by the display device 48 or may be recorded on a recording medium. The number of imaging cameras 52, an installation position of the imaging camera 52, and an image capturing range of the imaging camera 52 are not limited to those in the above-mentioned example, and may be any number, any installation position, and any image capturing range.

The USB charging connector 54 is a connector for performing charging according to the USB standard. Another feeding connector may be provided in place of the USB charging connector 54 for power supply to the accessories. For example, the small planing watercraft 10 may have a storage space 15 with a cover, and the USB charging connector 54 may be disposed within the storage space 15.

A device can thus be charged using the USB charging connector 54 within the storage space 15 separated from the exterior. The storage space 15 is located rearward of the handle device 20, for example. The device is a smartphone, for example. The number of USB charging connectors 54 and an installation position of the USB charging connector 54 are not limited to those in the above-mentioned example, and may be any number and any installation position.

The lighting devices 56 are devices emitting light. The lighting devices 56 are light emitting diodes or electric bulbs, for example. The lighting devices 56 are attached to surfaces of the deck 13 facing outward, for example. In FIG. 1, an example in which left and right lighting devices 56 are located on opposite sides of the front 13a is illustrated. The lighting devices 56 may be illumination lighting devices emitting light visible from around the small planing watercraft 10. Installation positions of the lighting devices 56 and the number of lighting devices 56 are not limited to those in the above-mentioned example, and may be any installation positions and any number.

The small planing watercraft 10 can travel on water without the speakers 50, the imaging camera 52, the USB charging connector 54, and the lighting devices 56. The speakers 50, the imaging camera 52, the USB charging connector 54, and the lighting devices 56 are thus examples of the accessory electrical component.

One or more of the speakers 50, the imaging camera 52, the USB charging connector 54, and the lighting devices 56 may be omitted. The small planing watercraft 10 sometimes includes another accessory electrical component without including the speakers 50, the imaging camera 52, the USB charging connector 54, and the lighting devices 56.

<Block Diagram>

Figure 2:
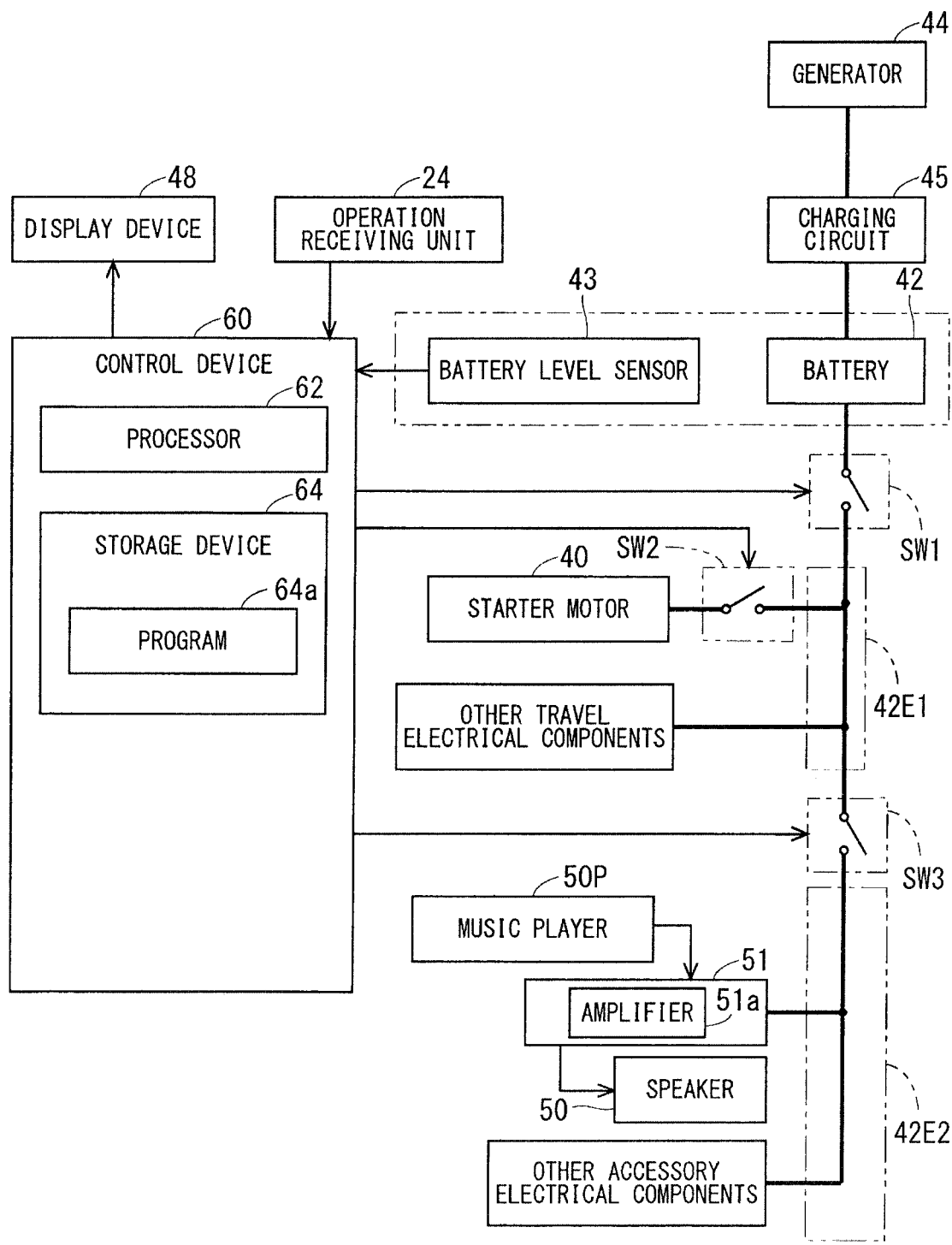
FIG. 2 is a block diagram showing an electrical configuration of the small planing watercraft.

FIG. 2 is a block diagram showing an electrical configuration of the small planing watercraft 10. The small planing watercraft 10 includes a control device 60. The control device 60 is a microcomputer including a processor 62, a storage device 64, and the like. The control device 60 is one example of processing circuitry. The processor 62 is an electrical circuit including an arithmetic circuit, and is a central processing unit (CPU), for example. The processor 62 may include one or more processor cores. Processing of the control device 60 may be achieved by one or more processors 62 of the control device 60, or may be achieved by cooperative processing of control devices. The storage device 64 is nonvolatile memory, such as flash memory. A software program 64a is stored in the storage device 64. The processor 62 performs arithmetic operation according to procedures described in the program 64a to perform control described below.

The control device 60 is connected to the display device 48, an operation receiving unit 24, a battery level sensor 43, the starter motor 40, and an amplification device 51.

The display device 48 performs display according to display control performed by the control device 60.

The operation receiving unit 24 receives input operation relating to operation from the operator, and provides a signal in response to the received input operation to the control device 60. That is to say, the small planing watercraft 10 includes the operation receiving unit 24 receiving the input operation from the operator. The operation receiving unit 24 is a switch outputting a signal in response to operation performed by a finger, and is a push switch or a slide switch, for example. The operation receiving unit 24 is disposed closer to the center along the width of the body 12 than the handle grips 22 of the handle device 20 are, for example. The operation receiving unit 24 may be disposed at another position. For example, the operation receiving unit 24 may be provided to the display device 48. The operation receiving unit 24 may be a touch panel incorporated in the display device 48. The operation receiving unit 24 includes a starter switch for initiating startup of the travel drive source 31 as the internal combustion engine, for example. The small planing watercraft 10 sometimes includes an operation receiving unit connected to the travel electrical component or the accessory electrical component and the like not through the control device 60. For example, a switch for operating the music player may be connected to the music player not through the control device 60.

The battery level sensor 43 is a sensor detecting a physical quantity corresponding to a level of the battery 42. As described above, the generator 44 is connected to the battery 42 through a charging circuit 45. The alternating current obtained by the generator 44 is rectified into the direct current, and is supplied to the battery 42 through the charging circuit 45 to charge the battery 42. The battery 42 supplies power to the travel electrical component and the accessory electrical component. In FIG. 2, an example in which the battery 42 supplies power to the starter motor 40 as one example of the travel electrical component and to the amplification device 51 including an amplifier 51a as one example of the accessory electrical component is shown. Due to power supply from the generator 44, the battery 42 is charged, and the level of the battery 42 is increased. The level of the battery 42 is reduced by power consumption of at least one of the travel electrical component and the accessory electrical component.

A signal detected by the battery level sensor 43 is provided to the control device 60. For example, a voltage of the battery 42 tends to have a positive correlation with the level of the battery 42. Assuming that the level of the battery 42 is obtained based on the voltage of the battery 42, the battery level sensor 43 may be a sensor detecting a physical quantity corresponding to the voltage of the battery 42, such as a voltage sensor. For example, the level of the battery 42 is affected by an incoming current into the battery 42, an outgoing current from the battery 42, and the temperature of the battery 42. Assuming that the level of the battery 42 is obtained from the incoming current into the battery 42, the outgoing current from the battery 42, the temperature of the battery 42, and the like, the battery level sensor 43 may include at least one of a current sensor and a temperature sensor in addition to or in place of the voltage sensor.

The battery 42 is connected to the travel electrical component through a travel power supply line 42E1, and is connected to the accessory electrical component through an accessory power supply line 42E2.

A main switch SW1 is provided between the battery 42 and the travel power supply line 42E1. Examples of the main switch SW1 include an electromagnetic relay and a semiconductor switch. When the operation receiving unit 24 receives operation to turn on a main power supply, an on command is provided to the main switch SW1, and the main switch SW1 is closed. Power is thus supplied from the battery 42 to the travel electrical component.

The starter motor 40 is connected to the travel power supply line 42E1 through a switch SW2. Examples of the switch SW2 include the electromagnetic relay and the semiconductor switch, and the switch SW2 is turned on and off in response to a command from the control device 60. When the switch SW2 is closed in response to an on command from the control device 60 with the main switch SW1 closed, the starter motor 40 is rotated due to power supply from the battery 42, and startup of the internal combustion engine is initiated. Due to rotation of the starter motor 40, the battery 42 is consumed, and the level of the battery 42 is reduced. When the on command is provided to the starter motor 40 from the control device 60, the starter motor 40 can be rotated in a case where the level of the battery 42 is sufficient to rotate the starter motor 40, and cannot be rotated or cannot sufficiently be rotated to initiate startup of the internal combustion engine in a case where the level of the battery 42 is insufficient to rotate the starter motor 40. When startup of the internal combustion engine is initiated, and the internal combustion engine continues to operate due to rotation of the starter motor 40, power generated by the generator 44 is supplied to the battery 42 to charge the battery 42.

A switch SW3 is provided between the travel power supply line 42E1 and the accessory power supply line 42E2. Examples of the switch SW3 include the electromagnetic relay and the semiconductor switch. The switch SW3 is opened and closed in response to a command from the control device 60. For example, the switch SW3 is normally closed. Power is thus supplied from the battery 42 to the accessory power supply line 42E2 through the travel power supply line 42E1 when the main switch SW1 is closed. When the switch SW3 is opened in response to an off command from the device 60, power supply to the accessory power supply line 42E2 is interrupted while power supply to the travel power supply line 42E1 is continued.

The amplification device 51 includes the amplifier 51a supplying the sound electrical signals to the speakers 50. The sound electrical signals output from a music player 50P are input into the amplifier 51a. Power is supplied from the battery 42 to the amplifier 51a through the accessory power supply line 42E2. The amplifier 51a includes an amplification circuit amplifying electrical signals, amplifies the sound electrical signals provided from the music player 50P using power supplied from the battery 42, and outputs the amplified sound electrical signals to the speakers 50. The speakers 50 covert the sound electrical signals as currents supplied from the amplifier 51a into sound, and emit the sound to an external environment. The amplifier 51a performs amplification while consuming power of the battery 42, so that power of the battery 42 is consumed, and the level of the battery 42 is reduced by operation of the amplifier 51a.

When operation is performed on the music player 50P, a control signal from the music player 50P is provided to the amplifier 51a. The amplifier 51a adjusts a degree of amplification in response to a control signal from the control device 60. The amplifier 51a performs amplification using power supplied from the battery 42, and thus is turned off by interruption of power supply to the accessory power supply line 42E2 regardless of the presence or absence of the signal from the music player 50P.

The music player 50P may be mounted on the small planing watercraft 10. The music player 50P may play music stored in portable flash memory. The music player 50P may be connected to a smartphone or a portable music player by wireless communication, and may generate the sound electrical signals based on data transmitted from the smartphone or the portable music player. The music player 50P and the amplification device 51 may physically be integrated as a single device.

The amplification device 51 is normally powered on and off with timing of power on and off of the music player 50P. The degree of amplification of the amplifier 51a is set in response to a volume of voice set through the music player 50P or the amplification device 51.

In FIG. 2, the starter motor 40 is shown as one example of the travel electrical component. The small planing watercraft 10 may include other travel electrical components. The amplification device 51 is shown as one example of the accessory electrical component in FIG. 2. The small planing watercraft 10 may include other accessory electrical components in addition to or in place of the amplification device 51. The other accessory electrical components are connected to the accessory power supply line 42E2 in FIG. 2. Some or all of the other accessory electrical components may be connected to a power supply line to which power supply is continued regardless of whether the switch SW3 is turned on or off.

Example of Display of Display Device

Figure 3:
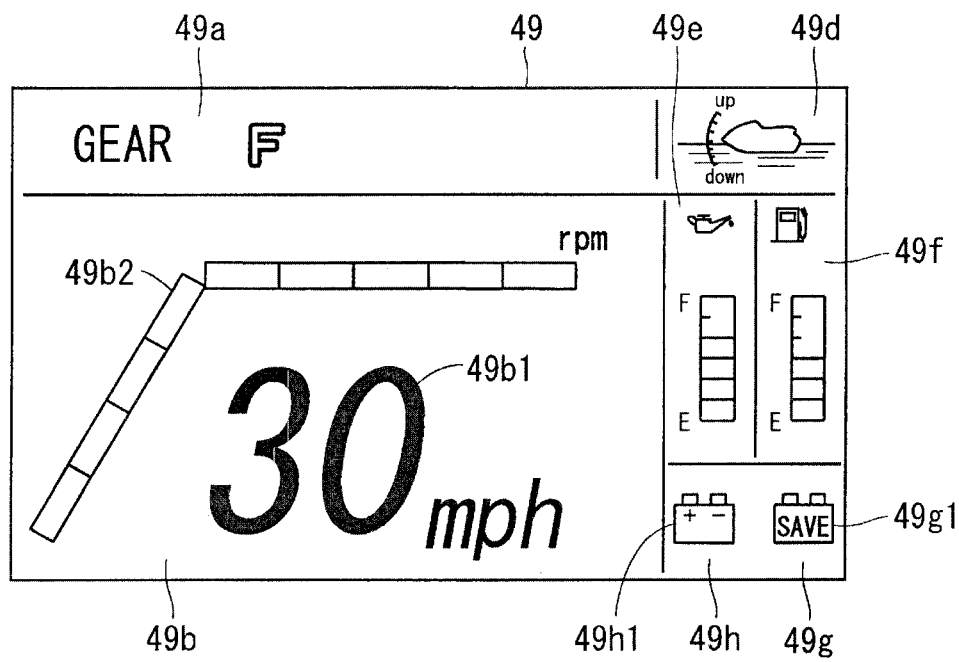
FIG. 3 illustrates an example of display of a display device.

FIG. 3 illustrates an example of display of the display device 48 at a power saving level. The display device 48 displays power saving level information 49g1 indicating that the level of the battery 42 is a predetermined level in response to a control command from the control device 60. The display device 48 displays warning level information 49h1 separately from the power saving level information when the level of the battery is further reduced.

For example, a display screen 49 of the display device 48 includes a gear position display region 49a, a travel information display region 49b, a trim angle display region 49d, an oil level display region 49e, a fuel level display region 49f, a power saving level information display region 49g, and a warning level information display region 49h. In addition to the above-mentioned battery level sensor 43, a speed sensor, an engine rpm sensor, a trim detection sensor, a fuel level detection sensor, an oil level detection sensor, and a lever or a switch for rearward movement or a stop are connected to the control device 60. The control device 60 can thus generate a signal for displaying each of the above-mentioned regions.

An example of the layout of the regions of the display screen 49 is as follows. The travel information display region 49b is the largest region expanding leftward and downward from the center of the display screen 49. Speed information 49b1 and engine rpm information 49b2 are displayed in the travel information display region 49b. The gear position display region 49a is located above the travel information display region 49b of the display screen 49. Information indicating any of forward movement, rearward movement, and a stop is displayed in the gear position display region 49a. The trim angle display region 49d is provided to the right of the gear position display region 49a. Information indicating a trim angle of the body 12 is displayed in the trim angle display region 49d. The oil level display region 49e and the fuel level display region 49f are displayed to the right of the travel information display region 49b. A level of lubricating oil of the internal combustion engine is displayed in the oil level display region 49e, and a level of fuel of the internal combustion engine is displayed in the fuel level display region 49f. The warning level information display region 49h is set below the oil level display region 49e, and the power saving level information display region 49g is set below the fuel level display region 49f. The warning level information 49h1 is displayed in the warning level information display region 49h. The warning level information 49h1 is a graphic representing the battery 42, for example, and a warning level is displayed by causing the graphic to blink or be lit. The warning level may be displayed not using the graphic but using a symbol or characters. The power saving level information 49g1 is displayed in the power saving level information display region 49g. The power saving level information 49g1 is information including a graphic representing the battery 42 and characters added to the graphic, for example. The characters are "SAVE", for example. A power saving level is displayed by causing the information to blink or be lit. The power saving level may be displayed using one of or a combination of a graphic, a symbol, and characters.

The layout and sizes of the regions of the display screen 49 are not limited to those in the above-mentioned example, and may be any layout and any sizes. At least one of the power saving level information 49g1 and the warning level information 49h1 may be displayed by a light emitting display device, such as a light emitting diode and an electric bulb.

Example of Processing of Control Device

Figure 4:
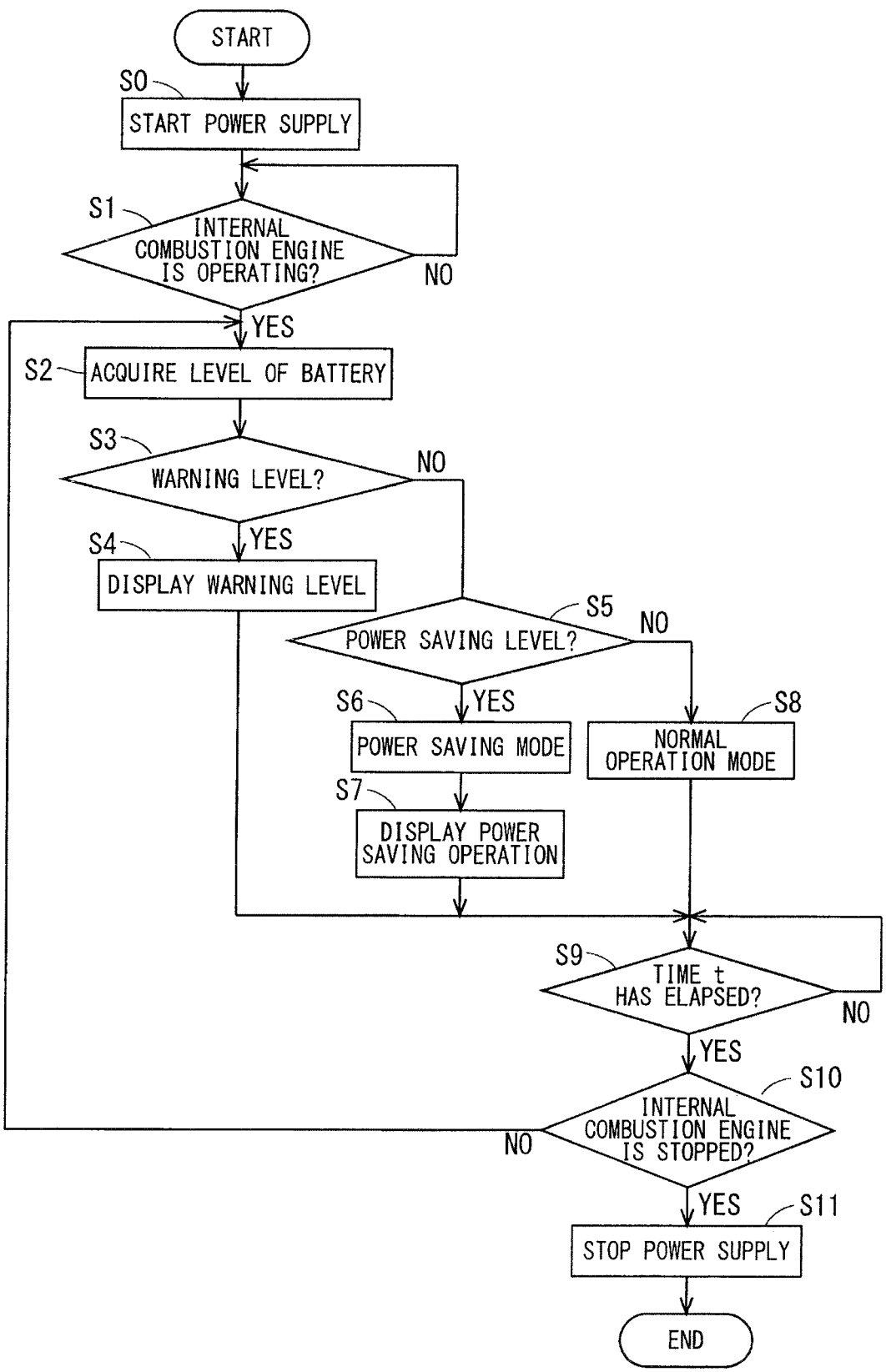
FIG. 4 is a flowchart showing an example of processing of a control device.

FIG. 4 is a flowchart showing an example of processing of the control device 60. The processing is performed in parallel with or in quasi-parallel with processing performed by the control device 60 for travel of the small planing watercraft 10, for example. The processing is also performed separately from and in parallel with or in quasi-parallel with processing based on music play operation performed through the music player 50P, the amplification device 51, or the operation receiving unit 24.

As shown in step S0, due to operation performed by the operator for turning on the main switch, an on signal is provided to the main switch SW1, and power supply to the travel power supply line 42E1 and the accessory power supply line 42E2 is started.

Next, as shown in step S1, due to ignition operation performed by the operator, the switch SW2 is turned on to rotate the starter motor 40, and the crankshaft of the travel drive source 31 is rotated. Whether the travel drive source 31 as the internal combustion engine is operating is determined. For example, the control device 60 is connected to the crank angle sensor. Rpm of the internal combustion engine based on a result of detection of the crank angle sensor is compared with predetermined reference rpm. The reference rpm is set to be smaller than idling rpm of the internal combustion engine, for example. It is determined that the internal combustion engine is operating when the detected rpm is equal to or greater than the reference rpm or exceeds the reference rpm. Processing in step S1 is repeated when it is determined that the internal combustion engine is not operating. Processing proceeds to step S2 when it is determined that the internal combustion engine is operating.

In step S2, the level of the battery 42 is acquired based on a result of detection of the battery level sensor 43. The level of the battery 42 may be grasped by a voltage detected by the battery level sensor 43. The level of the battery 42 may also be grasped by an arithmetic value computed by the voltage, the current, the temperature, and the like of the battery 42. The arithmetic value may be a charging rate indicating a ratio of a remaining capacity to a full charge capacity, for example.

In next step S3, whether the level of the battery 42 is the warning level is determined based on the level of the battery 42. The warning level is set as a level which is lower than the power saving level and at which operation of the travel electrical component involved in travel of the small planing watercraft 10 can be destabilized, for example. The warning level may be set as a level at which the voltage detected by the battery level sensor 43 falls below a predetermined warning voltage or is equal to or lower than the predetermined warning voltage, for example. The warning level may also be set as a level at which the charging rate of the battery computed by the result of detection of the battery level sensor 43 falls below a predetermined warning charging rate or is equal to or lower than the predetermined warning charging rate, for example. A warning threshold defining the warning level is smaller than a threshold for determination of the power saving level, which will be described below. The warning voltage or the warning charging rate may empirically and experimentally be determined, for example. Processing proceeds to step S4 when it is determined that the level of the battery 42 is the warning level through comparison between the result of detection of the battery level sensor 43 and the warning threshold indicating the above-mentioned warning level, and proceeds to step S5 when it is determined that the level of the battery 42 is not the warning level.

The warning level is displayed in step S4. For example, the warning level information 49h1 is displayed by the display device 48 to be lit or blink. The operator can thus recognize that the level of the battery 42 is the warning level. Processing in step S4 is only required to be processing to provide notification of the warning level. A notification device may be a buzzer or a speaker, and processing in step S4 may be processing to provide notification of the warning level with sound of the buzzer or the speaker. The operator can stop operation of the small planing watercraft 10, and perform maintenance and the like. Processing proceeds to step S9 after step S4.

Processing in steps S3 and S4 described above may be omitted, and processing may proceed to step S5 after step S2.

In step S5, whether the level of the battery 42 is the power saving level is determined based on the level of the battery 42. The power saving level is set as a level insufficient to initiate startup of the internal combustion engine by rotation of the starter motor 40, for example. The power saving level may be set as a level at which the voltage detected by the battery level sensor 43 falls below a predetermined power saving voltage or is equal to or lower than the predetermined power saving voltage, for example. The power saving level may also be set as a level at which state of charge (SOC) of the battery computed by the result of detection of the battery level sensor 43 falls below a predetermined power saving charging rate or is equal to or lower than the predetermined power saving charging rate, for example. The power saving level may be set to be higher than a level at which the travel electrical component is operable. For example, a threshold defining the power saving level may be set to be greater than the warning threshold defining the above-mentioned warning level. The power saving voltage or the power saving charging rate may empirically and experimentally be determined, for example. For example, processing proceeds to step S6 when it is determined that the level based on the result of detection of the battery level sensor 43 falls below the power saving threshold indicating the above-mentioned power saving level or is equal to or smaller than the power saving threshold through comparison between the result of detection and the power saving threshold, and the level of the battery 42 is the power saving level, and proceeds to step S8 when it is determined that the level of the battery 42 is not the power saving level.

Transition to a power saving mode is made in step S6. The power saving mode is a mode in which operation of the accessory electrical component is controlled so that power consumed by the accessory electrical component is less than that before determination of the power saving level. Details of control of the accessory electrical component in the power saving mode are not particularly limited as long as power consumed by the accessory electrical component is reduced in the power saving mode.

In the present embodiment, the control device 60 stops power supply to at least one accessory electrical component when it is determined that the level is the power saving level. In a case where the control device 60 stops power supply to one or more of accessory electrical components as another example, the control device 60 may preferentially stop power supply to an accessory electrical component consuming large power. For example, in a case where the control device 60 stops power supply to one of the accessory electrical components, the control device 60 may stop power supply to an accessory electrical component consuming the largest power. The control device 60 may stop power supply to all of one or more accessory electrical components.

The control device 60 may use any configuration to stop power supply to the accessory electrical component. In the present embodiment, the control device 60 provides the off command to the switch SW3 provided between the accessory electrical component and the battery 42, and interrupts a power supply circuit for the accessory power supply line 42E2 based on the off command.

Power supply to the accessory power supply line 42E2 may be stopped to stop power supply to all the circuits included in the accessory electrical component or to stop power supply to one or more of the circuits included in the accessory electrical component. As will be described in a first modification below, in a case where the accessory electrical component includes a power supply control circuit, for example, the power supply control circuit may perform power supply control to stop functions of one or more of the circuits included in the accessory electrical component and continue operation of functions of the other one or more of the circuits included in the accessory electrical component in response to a power supply stop command from the control device 60. That is to say, power supply to the accessory electrical component may be stopped to completely stop power supply to the accessory electrical component or to stop power supply to one or more of the circuits included in the accessory electrical component to switch the mode to a sleep mode or a non-operating mode in which power is saved compared with that in normal operation.

For example, the control device 60 may stop power supply to the amplifier 51a in the power saving mode. It is assumed that power consumed by the amplifier 51a is more than power consumed by each of the imaging camera 52, the USB charging connector 54, and the lighting devices 56. Consumption of the battery 42 is thus effectively suppressed by stopping power supply to the amplifier 51a.

When it is determined that the level is the power saving level, the control device 60 may control operation of the accessory electrical component so that at least one accessory electrical component operates with less power than that before determination, for example, as will be described in the first modification and the like below. For example, the control device 60 may provide the amplifier 51a with a command to lower a reproduced sound volume. If the amplifier 51a reduces the degree of amplification in response to the command, consumption of the battery 42 is suppressed. In a case where brightness of the lighting devices 56 is adjusted by a dimming circuit, for example, the control device 56 may provide the dimming circuit with a command to reduce brightness. If the dimming circuit reduces brightness of the lighting devices 56 in response to the command, consumption of the battery 42 is suppressed.

In a case where the small planing watercraft 10 includes accessory electrical components, power supply to one or more of the accessory electrical components may be stopped, and operation of the other accessory electrical components may be switched to power saving operation in the power saving mode.

Even when it is determined that the level is the power saving level in step S5, the control device 60 maintains control of the travel electrical component similarly to that before determination of the power saving level. For example, rpm of the internal combustion engine before determination of the power saving level is maintained without change in timing of ignition of the internal combustion engine. This has an advantage of easily maintaining a state of travel of the small planing watercraft 10, for example. That is to say, rotation of the impeller 32 can be continued in the small planing watercraft 10 with the internal combustion engine maintained in an idling state. In this case, the reverse bucket 35 is maintained at the neutral position between the retracted position and the reverse position, so that flows in the fore-aft direction match each other, and the small planing watercraft 10 is stopped. In a case where the level of the battery 42 is low, it is assumed that rpm of the internal combustion engine is increased to increase the amount of generated power. In this case, flows in the fore-aft direction regulated by the reverse bucket 35 may not match each other. Thus, the internal combustion engine is maintained in the idling state in which rpm of the internal combustion engine is the same even when it is determined that the level is the power saving level, so that flows in the fore-aft direction are maintained to match each other, and a stop state of the small planing watercraft 10 is likely to be maintained constant. In a case where the small planing watercraft 10 is traveling, rpm is not required to be maintained constant, and control, such as acceleration and deceleration, of the travel electrical component should be performed based on operation of the operator.

Processing in step S6 may be performed after it is determined that the level is the warning level in step S3.

In next step S7, the power saving operation is displayed. For example, the power saving level information 49g1 is displayed by the display device 48 to be lit or blink. The operator can thus recognize that the level of the battery 42 is the power saving level. The display device 48 is one example of the notification device. The operator can know the reason why operation has been switched to the power saving operation when operation of the accessory electrical component is stopped. Processing in step S7 is only required to be processing to provide notification of the power saving level. The notification device may be the buzzer or the speaker, and processing in step S7 may be processing to provide notification of the power saving level with sound of the buzzer or the speaker. Notification of the power saving level provided in step S7 should be distinguishable from notification of the warning level provided in step S4. For example, notification of the power saving level and notification of the warning level may differ in display content, buzzer sound, or notification voice. Processing proceeds to step S9 after step S7.

Processing proceeds to step S8 when it is determined that the level is not the power saving level in step S5. In step S8, a normal operation mode is continued, or transition to the normal operation mode is made. The normal operation mode is a mode in which the accessory electrical component is operating in response to operation of the operator. The battery 42 can be charged with power generated by the generator 44 after transition to the power saving mode while processing in steps S2 to S10 is repeated. In this case, processing to determine that the level is not the power saving level in step S5 is processing to determine that the level of the battery 42 is a non-power saving level set to be higher than the power saving level. In this case, processing proceeds to step S8, and transition to the normal operation mode is made to end the power saving mode to reduce power consumed by the accessory electrical component. Processing proceeds to step S9 after step S8.

In step S9, whether a predetermined standby time t has elapsed or not is determined. The standby time t is a cycle time to perform processing in steps S2 to S9. For example, whether the predetermined standby time t has elapsed since acquisition of the level of the battery 42 in step S2 is determined. Processing in step S9 is repeated until it is determined that the standby time t has elapsed, and processing proceeds to step S10 when it is determined that the standby time t has elapsed. Processing in step S9 may be omitted.

The internal combustion engine is stopped by operation to stop operation (e.g., kill switch operation) performed by the operator. In step S10, whether the travel drive source 31 as the internal combustion engine is stopped is determined. For example, the control device 60 determines whether the internal combustion engine is stopped based on rpm of the internal combustion engine based on the result of detection of the crank angle sensor. Processing returns to step S2 to repeat processing in and after step S2 when it is determined that the internal combustion engine is not stopped, and proceeds to step S11 when it is determined that the internal combustion engine is stopped.

Power supply from the battery to each electrical component is stopped by operation to stop the main switch performed by the operator. In step S11, power supply to the accessory electrical component is stopped. Consumption of the battery 42 after the stop of the internal combustion engine is thus suppressed. Processing ends thereafter.

According to the small planing watercraft 10 having a configuration as described above and a method of controlling the small planing watercraft 10, operation of the accessory electrical component is controlled to reduce power consumed by the accessory electrical component when the level of the battery 42 is the predetermined power saving level. Reduction in level of the battery 42 is thus suppressed, and the influence of reduction in level of the battery 42 on travel of the small planing watercraft 10 can be suppressed.

Assume that power consumed by the accessory electrical component increases due to an abnormality, such as a short circuit, caused during operation of the internal combustion engine in the small planing watercraft 10, for example. In some cases, the consumed power exceeds power generated by the generator 44 to continue reducing the level of the battery 42. In the present embodiment, consumption of the accessory electrical component can be suppressed to suppress the influence on travel of the small planing watercraft 10 in the above-mentioned case.

The power saving level is set to be higher than the level at which the travel electrical component is operable. A state in which the travel electrical component can normally be operated can be extended to suppress the influence on travel of the small planing watercraft 10.

The travel electrical component includes the starter motor 40. The power saving level is set to be higher than a momentary level of the battery necessary for operation of the starter motor 40. The level of the battery 42 is thus guaranteed to be higher than the level at which the starter motor 40 is operable during operation of the internal combustion engine. The level of the battery 42 is thus higher than the level at which the starter motor 40 is operable even when operation of the internal combustion engine is stopped. A stop of operation of the starter motor 40 due to reduction in level of the battery 42 can thus be prevented.

Furthermore, power supply to the accessory electrical component is stopped when the travel drive source 31 is stopped. Reduction in level of the battery 42 can thus be suppressed even when power generation of the generator 44 cannot be expected by the stop of the travel drive source 31.

Furthermore, whether the level is the power saving level is regularly determined based on the result of detection of the battery level sensor 43 during operation of the travel drive source 31, and, when it is determined that the level of the battery 42 is the predetermined level, operation of the accessory electrical component is controlled to reduce power consumed by the accessory electrical component. The remaining capacity of the battery 42 is thus less likely to be reduced. The battery 42 is expected to be charged with power generated by the generator 44.

Furthermore, when it is determined that the level is the power saving level, control of the travel electrical component is maintained similarly to that before determination of the power saving level. The influence on travel or the stop of the small planing watercraft 10 can thus be suppressed. In a case where the internal combustion engine is in the idling state, the stop state of the small planing watercraft 10 can be stabilized by maintaining rpm of the internal combustion engine constant, for example.

Furthermore, the consumed power can be reduced by stopping power supply to at least one accessory electrical component in the power saving mode.

The accessory electrical component includes the amplifier 51a, and power consumed by the amplifier 51a is reduced in the power saving mode. The amplifier 51a consumes a current of 4 A to 5 A, for example, and, depending on the consumed current, can consume larger power than each of the imaging camera 52 and the lighting devices 56. Reduction in level of the battery 42 can effectively be suppressed by reducing power consumed by the amplifier 51a. Reduction in level of the battery 42 can effectively be suppressed, for example, by stopping power supply to the amplifier 51a.

Furthermore, the amplifier 51a may be caused to lower the reproduced sound volume when it is determined that the level is the power saving level. Reduction in level of the battery 42 can thus effectively be suppressed while reproduction is maintained.

Furthermore, the display device 48 is caused to provide notification of the power saving level when the level is the power saving level, for example. The people on board can thus be notified that the level of the battery 42 is the predetermined level. For example, the people on board can recognize a cause of power saving operation performed by the amplifier 51a to stop or lower reproduced sound of the speakers 50.

Furthermore, notification of the warning level is provided separately from notification of the above-mentioned power saving level, so that the people on board can recognize the warning level separately from the power saving level.

Furthermore, the power saving mode in which control is performed to reduce power consumed by the accessory electrical component is stopped, and transition to the normal operation mode is made when the battery 42 is charged with power generated by the generator 44, the level of the battery 42 is out of the power saving level, and it is determined that the level of the battery 42 is the non-power saving level set to be higher than the power saving level. The accessory electrical component can thus normally be operated.

Control to reduce power consumed by the accessory electrical component may not necessarily be performed when it is determined that the level is the power saving level in the small planing watercraft 10. The notification device may be caused to provide notification when it is determined that the level of the battery 42 is the predetermined power saving level, and may be caused to provide notification of the warning level separately from notification of the power saving level when it is determined that the level of the battery 42 is the warning level, for example.

The people on board can thus be prompted to take action to reduce consumption of the battery 42 when the level is the power saving level and the warning level. The people on board can be notified of the warning level separately from the power saving level. For example, the people on board having recognized the power saving level can recognize that suppression of power consumed by the accessory electrical component allows for travel.

In the present embodiment, the control device 60 provides the command to open or close the switch SW3 located upstream of a flow of a current through the accessory power supply line 42E2. Power supply to all the accessory electrical components connected to the accessory power supply line 42E2 can thus be stopped. A circuit configuration can thus be simplified compared with a case where a power saving command is provided to each of the accessory electrical components. Addition of an accessory electrical component is also easy.

Modifications

Various modifications based on the above-mentioned embodiment will be described.

First Modification

Figure 5:
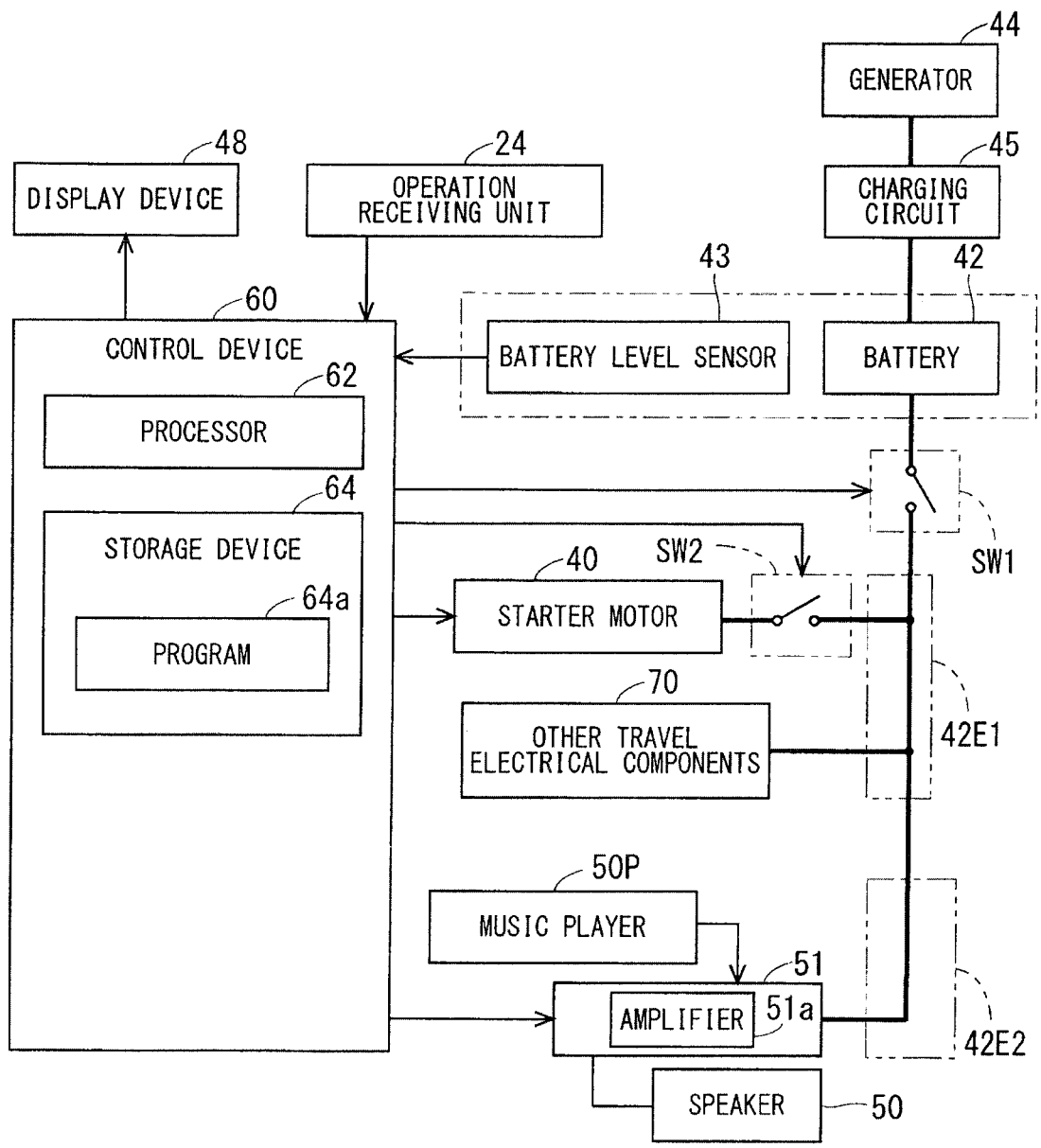
FIG. 5 is a block diagram showing an electrical configuration of a small planing watercraft according to a first modification.

FIG. 5 is a block diagram showing a first modification. Main differences from the above-mentioned embodiment are that the switch SW3 is omitted, and a command relating to power consumption is provided from the control device 60 to the amplification device 51.

When it is determined that the level is the power saving level in step S5 described above, the control device 60 may provide a power off command to the power supply control circuit incorporated in the amplification device 51 to stop power supply to the amplification device 51. As described in the embodiment, power supply to the amplification device 51 may be stopped to stop power supply to one or more of the circuits included in the amplification device 51. Power supply to the amplification device 51 may thus be stopped to completely stop power supply to the amplification device 51 or to stop power supply to one or more of the circuits included in the amplification device 51 to switch the mode to the sleep mode or the non-operating mode in which power is saved compared with that in normal operation.

When it is determined that the level is the power saving level in step S5 described above, the control device 60 may provide the command to lower the reproduced sound volume to the power supply control circuit incorporated in the amplification device 51. In this case, the amplification device 51 is caused to lower the reproduced sound volume in response to the command. Power consumed by the amplification device 51 is thus less than that before lowering of the reproduced sound volume.

In the first modification, power supply to the amplification device 51 may be stopped by the switch SW3 as in the above-mentioned embodiment. Also in this case, power consumed by the amplification device 51 may be reduced by causing the amplification device 51 to change the reproduced sound volume in response to the command from the control device 60 while power supply is continued depending on the level of the battery 42, and power consumed by the amplification device 51 may further be reduced by turning off the switch SW3, for example.

Second Modification

Figure 6:
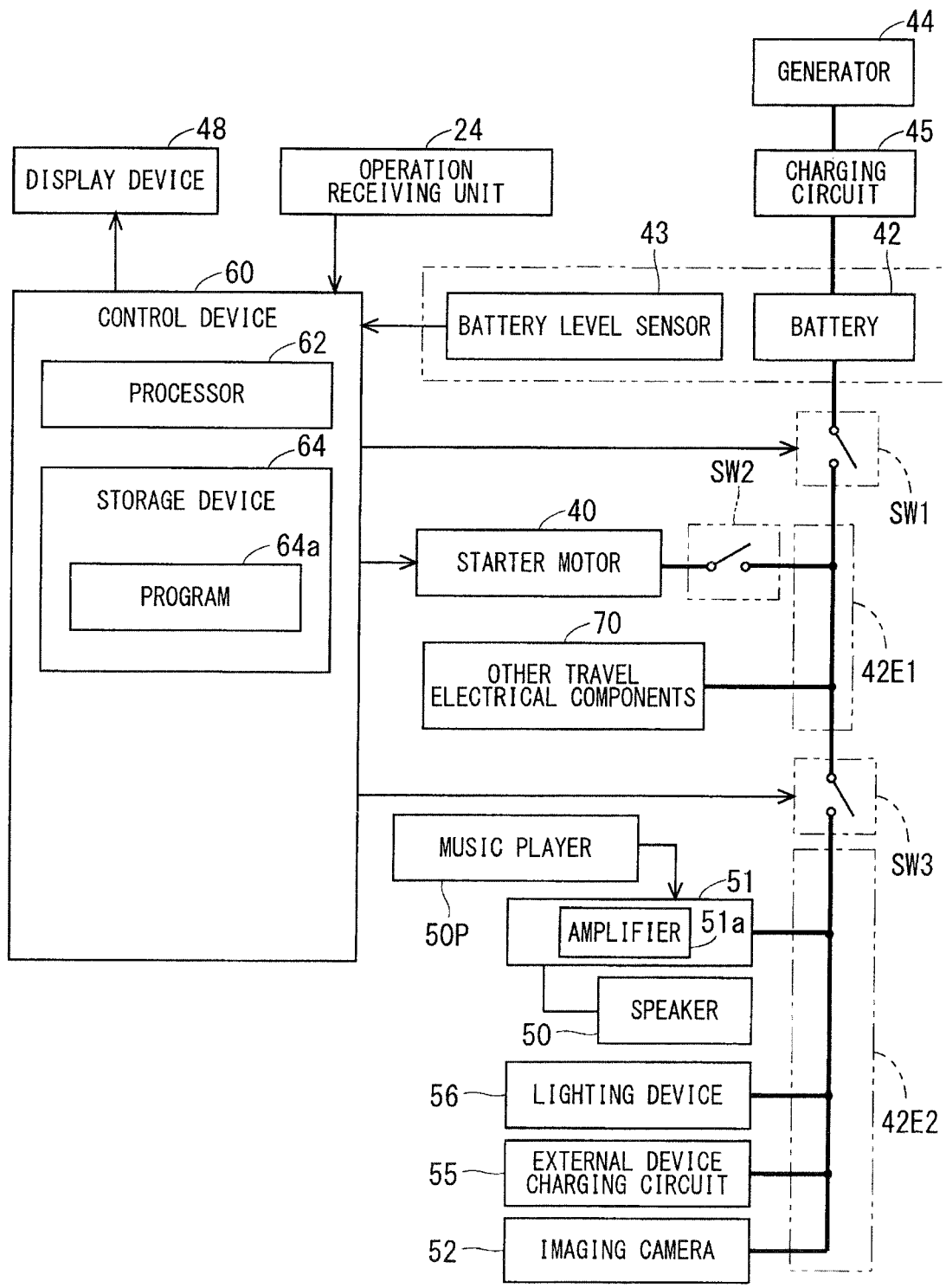
FIG. 6 is a block diagram showing an electrical configuration of a small planing watercraft according to a second modification.

FIG. 6 is a block diagram showing a second modification. In the second modification, the small planing watercraft 10 includes accessory electrical components. In FIG. 6, the amplification device 51, a lighting device 56, an external device charging circuit 55, and the imaging camera 52 are shown as the accessory electrical components. The small planing watercraft 10 includes the switch SW3 collectively switching states of power supply from the battery 42 to the accessory electrical components 51, 52, 55, and 56. The switch SW3 is a circuit including the semiconductor switch and the electromagnetic relay, for example, and is provided between the battery 42 and a common power supply circuit for the accessory electrical components 51, 52, 55, and 56. In the second modification, the switch SW3 is provided between the travel power supply line 42E1 and the accessory power supply line 42E2. The accessory electrical components 51, 52, 55, and 56 are connected to the accessory power supply line 42E2. The switch SW3 is turned on and off in response to a control signal from the control device 60. Power is supplied from the battery 42 to the accessory electrical components 51, 52, 55, and 56 through the accessory power supply line 42E2 when the switch SW3 is turned on, and power supply from the battery 42 to the accessory electrical components 51, 52, 55, and 56 through the accessory power supply line 42E2 is stopped when the switch SW3 is turned off. According to this example, the states of power supply to the accessory electrical components 51, 52, 55, and 56 can be switched by a single control command, and thus a configuration is simple.

Third Modification

Figure 7:
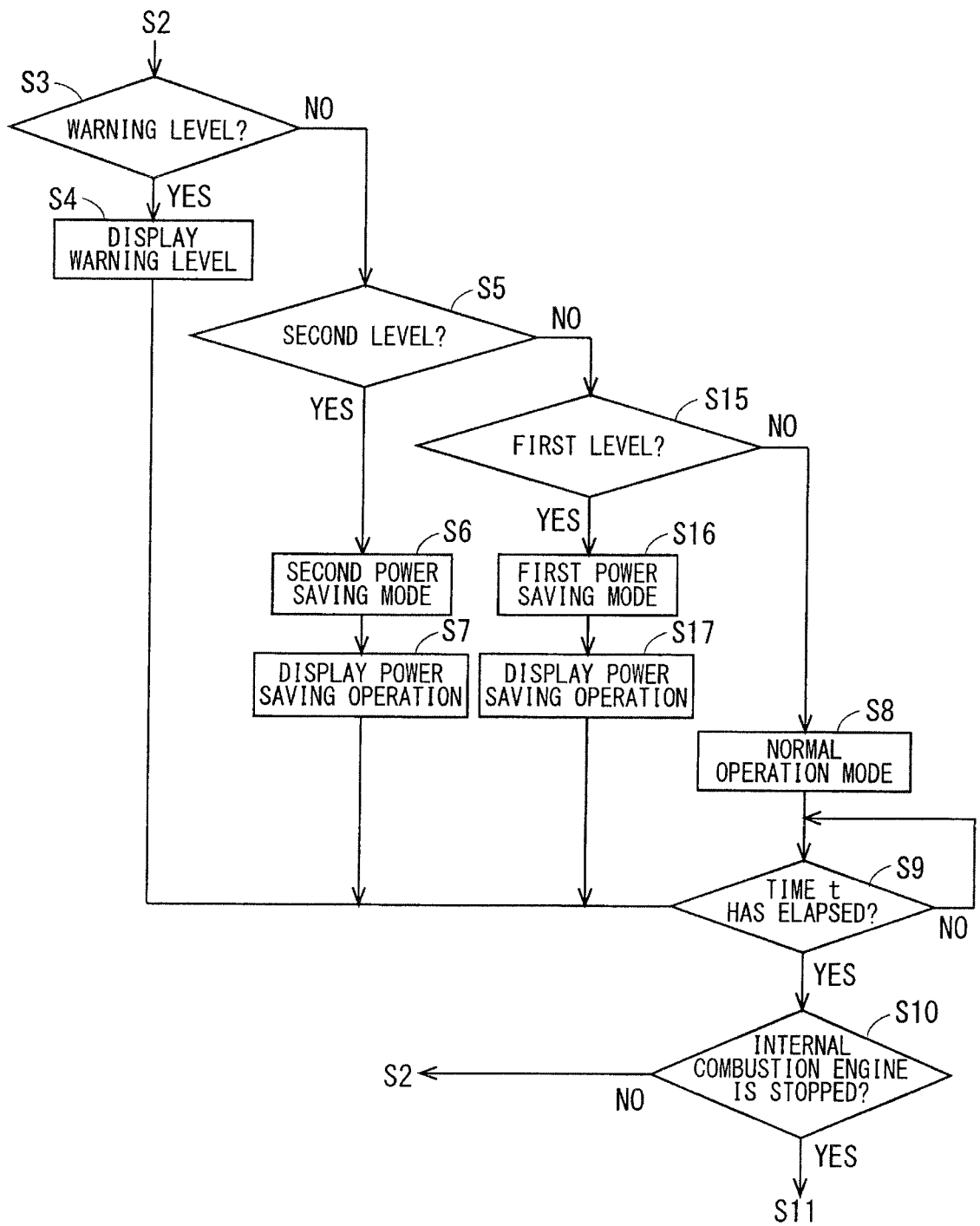
FIG. 7 is a flowchart showing an example of processing of a control device according to a third modification.

FIG. 7 is a flowchart showing an example of processing of a control device according to a third modification. Differences from processing in the above-mentioned embodiment will mainly be described.

In the third modification, processing in steps S3, S4, S8, S9, and S10 is the same as that described in the above-mentioned embodiment.

Processing in steps S5 and S15 is similar to that in step S5 described in the above-mentioned embodiment, but differs in criterion for determination. Processing in steps S6 and S16 is the same as that in step S6 described in the above-mentioned embodiment in that power consumed by the accessory electrical component is reduced. Power consumed by the accessory electrical component, however, differs incrementally between processing in step S6 and processing in step S16.

That is to say, whether the level is a second level is determined in step S5. When it is determined that the level is the second level in step S5, processing proceeds to step S6, and transition to a second power saving mode is made. When it is determined that the level is not the second level in step S5, processing proceeds to step S15.

Whether the level is a first level is determined in step S15. When it is determined that the level is the first level in step S15, processing proceeds to step S16, and transition to a first power saving mode is made. When it is determined that the level is not the first level in step S15, processing proceeds to step S8.

The above-mentioned second level is set to be lower than the first level. For example, a threshold for determining the second level is set to be smaller than a threshold for determining the first level.

In the above-mentioned first power saving mode, operation of the accessory electrical component is controlled so that power consumed by the accessory electrical component is less than that before determination of the first level. In the second power saving mode, operation of the accessory electrical component is controlled so that power consumed by the accessory electrical component is less than that before determination of the second level. The second level is lower than the first level, so that operation of the accessory electrical component is controlled so that power consumed by the accessory electrical component in the second power saving mode is less than that in the first power saving mode.

In the first power saving mode, the control device 60 provides the amplifier 51a with a command to lower the reproduced sound volume as described in the first modification, for example. Reproduction performed by the speakers 50 is thus continued with the reproduced sound volume lowered. In the second power saving mode, the control device 60 stops power supply to the amplifier 51a, for example. Sound from the speakers 50 can thus no longer be heard.

In the first power saving mode, the reproduced sound volume is smaller than that before determination of the first level. Power consumed by the amplifier 51a is less than that before determination, but power consumption is continued. An increase in level of the battery 42 caused by the generator 44 is thus smaller than that in the second power saving mode. In the second power saving mode, reproduction is stopped compared with a case before determination of the second level. The amplifier 51a consumes no power, so that the increase in level of the battery 42 caused by the generator 44 is greater than that in the first power saving mode. That is to say, the first power saving mode is a mode in which maintenance of operation of the accessory electrical component and charging of the battery 42 are both achieved, and the second power saving mode is a mode in which a higher priority is given to charging of the battery 42 than to operation of the accessory electrical component.

That is to say, in the present modification, a state of power supply to the accessory electrical component is not switched between an on state and an off state, but a command is provided to the accessory electrical component itself or to a drive circuit and the like controlling operation of the accessory electrical component to switch power consumed by the accessory electrical component in stages.

According to the third modification, power consumed by the accessory electrical component can be reduced in stages depending on the level of the battery 42. Consumed power may be switched in three or more stages. For example, power consumed by the amplifier 51a can be switched in stages by more incrementally dividing the reproduced sound volume.

Operation for incremental power consumption of the accessory electrical component may be set for a single accessory electrical component or a combination of accessory electrical components.

Fourth Modification

In a fourth modification, an example in which the first power saving mode and the second power saving mode are performed by a combination of accessory electrical components is described based on the third modification.

The small planing watercraft 10 includes, as the accessory electrical components, the amplification device 51 including the amplifier 51a, the lighting device 56 controlled to be driven by the dimming circuit 57, the external device charging circuit 55 supplying charging power to the USB charging connector 54, and the imaging camera 52 (see an example shown in FIG. 6). The amplification device 51, the dimming circuit 57, the external device charging circuit 55, and the imaging camera 52 are connected to the battery 42, and receive power from the battery 42. The control device 60 is connected to the amplification device 51, the dimming circuit 57, the external device charging circuit 55, and the imaging camera 52. A state of power supply to the amplifier 51a of the amplification device 51 and a state of power supply to the lighting device 56 through the dimming circuit 57 are controlled by the control command from the control device 60. A state of power supply to the external device charging circuit 55 and the imaging camera 52 is controlled by the control command from the control device 60.

Power supply to one or more of the above-mentioned accessory electrical components may be stopped when it is determined that the level of the battery 42 is the first level, and power supply to additional one or more accessory electrical components may be stopped when it is determined that the level of the battery 42 is the second level. For example, power supply to the amplifier 51a may be stopped when it is determined that the level of the battery 42 is the first level, and power supply to the lighting device 56, the external device charging circuit 55, and the imaging camera 52 may be stopped when it is determined that the level of the battery 42 is the second level.

The fourth modification can be achieved by dividing the accessory electrical components into groups, providing power supply lines for respective groups, and switching on and off each of the power supply lines, for example. The fourth modification can also be achieved, in a case where a power supply circuit is incorporated in each of the accessory electrical components, by controlling the power supply circuit of each of the accessory electrical components using the control device 60, for example.

The number of accessory electrical components to which power supply is stopped can thus sequentially be increased depending on the level of the battery 42 to incrementally reduce power consumed by the accessory electrical components.

Fifth Modification

Figure 8:
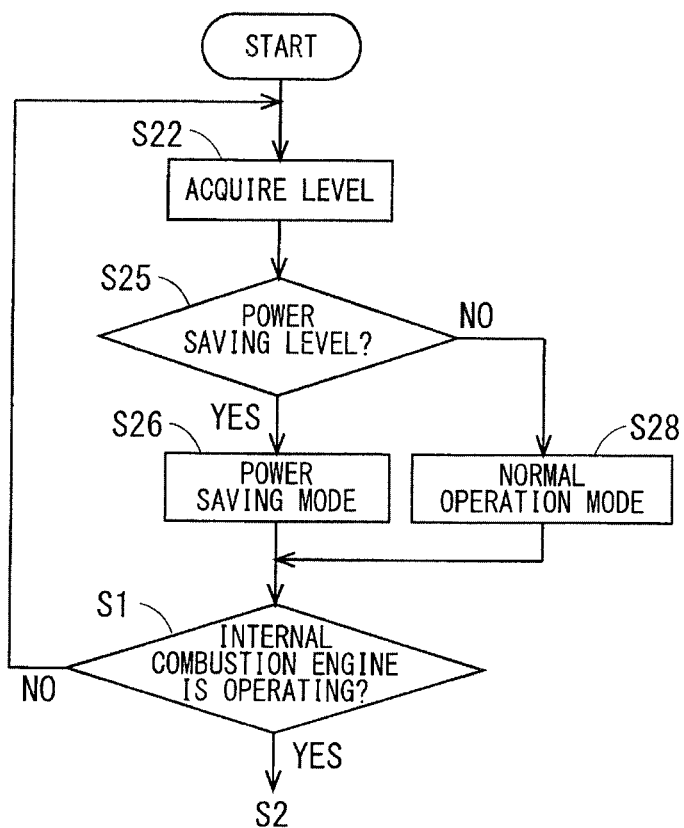
FIG. 8 is a flowchart showing an example of processing of a control device according to a fifth modification.

FIG. 8 is a flowchart showing an example of processing of a control device according to a fifth modification. Differences from processing in the above-mentioned embodiment will mainly be described.

In the fifth modification, processing in steps S22, S25, S26, and S28 is performed before processing in step S1 to determine whether the internal combustion engine is operating. Processing in step S22 is the same as that in step S2, processing in step S25 is the same as that in step S5, processing in step S26 is the same as that in step S6, and processing in step S28 is the same as that in step S8. A criterion for determination on whether the level is the power saving level in step S25 may differ from that in step S5.

According to this processing example, operation of the accessory electrical component is controlled to reduce power consumed by the accessory electrical component when it is determined that the level of the battery 42 is the predetermined level based on the result of detection of the battery level sensor 43 even while the travel drive source 31 is stopped. Power consumed by the accessory electrical component can thus be reduced to make the level of the battery 42 less likely to be reduced when it is determined that the level of the battery 42 is the predetermined level even while the travel drive source 31 is stopped.

Configurations described in the above-mentioned embodiment and modifications can be combined with each other as appropriate unless any contradiction occurs.

Additional Remark

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The present application discloses the following aspects.

A first aspect is a small planing watercraft including: a travel electrical component driven for travel of the small planing watercraft; an accessory electrical component provided separately from the travel electrical component; a battery supplying power to the travel electrical component and the accessory electrical component; a sensor detecting a physical quantity corresponding to a level of the battery; and processing circuitry determining, based on a result of detection of the sensor, whether the level of the battery is a predetermined power saving level, and controlling, when it is determined that the level of the battery is the power saving level, operation of the accessory electrical component so that power consumed by the accessory electrical component is less than that before determination.

Operation of the accessory electrical component is thus controlled to reduce power consumed by the accessory electrical component when the level of the battery is the predetermined power saving level. The influence of reduction in level of the battery on travel of the small planing watercraft can thus be suppressed.

A second aspect is the small planing watercraft according to the first aspect, wherein the power saving level is set to be higher than a level at which the travel electrical component is operable. A state in which the travel electrical component can normally be operated can be extended to suppress the influence on travel of the small planing watercraft.

A third aspect is the small planing watercraft according to the second aspect further including: an internal combustion engine generating propulsion power as a travel drive source; and a generator receiving a portion of the power generated by the internal combustion engine, and generating power to charge the battery, wherein the travel electrical component includes a starter motor assisting in initiating startup of the internal combustion engine. A stop of operation of the starter motor due to reduction in level of the battery can thus be prevented.

A fourth aspect is the small planing watercraft according to the first aspect further including: a travel drive source; and a generator generating power using power from the travel drive source to charge the battery, wherein the processing circuitry stops power supply to the accessory electrical component when the travel drive source is stopped. Reduction in level of the battery can thus be suppressed while the travel drive source is stopped.

A fifth aspect is the small planing watercraft according to the first aspect further including a travel drive source, wherein the processing circuitry regularly determines whether the level of the battery is the power saving level based on the result of detection of the sensor during operation of the travel drive source, and controls, when it is determined that the level of the battery is a predetermined level, operation of the accessory electrical component to reduce power consumed by the accessory electrical component. In this case, power consumed by the accessory electrical component can be reduced to make a remaining capacity of the battery less likely to be reduced when it is determined that the level of the battery is the predetermined level during operation of the travel drive source after startup.

A sixth aspect is the small planing watercraft according to the first aspect, wherein the processing circuitry controls, when it is determined that the level of the battery is the power saving level, operation of the accessory electrical component to reduce power consumed by the accessory electrical component while maintaining control of the travel electrical component similarly to that before determination. In this case, the influence on travel or the stop of the small planing watercraft can be suppressed.

A seventh aspect is the small planing watercraft according to the first aspect, wherein the accessory electrical component includes one or more accessory electrical components, and the processing circuitry stops power supply to at least one of the accessory electrical components when it is determined that the level of the battery is the power saving level. Power consumption of the accessory electrical component to which power supply is stopped can thus effectively be suppressed.

An eighth aspect is the small planing watercraft according to the first aspect, wherein the accessory electrical component includes accessory electrical components, the small planing watercraft further includes a switch collectively switching states of power supply from the battery to the accessory electrical components, and the processing circuitry controls the switch to stop power supply to the accessory electrical components when it is determined that the level of the battery is the power saving level. In this case, control of the electrical components can be switched by a single control command.

A ninth aspect is the small planing watercraft according to the first aspect, wherein the accessory electrical component includes an amplifier supplying a current to a speaker. Large power is supplied to the speaker to play music. Reduction in level of the battery can effectively be suppressed by suppressing power consumed by the amplifier.

A tenth aspect is the small planing watercraft according to the ninth aspect, wherein the processing circuitry performs control to stop power supply to the amplifier when it is determined that the level of the battery is the power saving level. Reduction in level of the battery can effectively be suppressed by stopping power supply to the amplifier.

An eleventh aspect is the small planing watercraft according to the ninth aspect, wherein the processing circuitry causes the amplifier to lower a reproduced sound volume when it is determined that the level of the battery is the power saving level. In this case, reduction in level of the battery can effectively be suppressed while reproduction is continued.

A twelfth aspect is the small planing watercraft according to the first aspect further including a notification device providing recognizable information to a person on board of the small planing watercraft, and the processing circuitry causes the notification device to provide notification of the power saving level when it is determined that the level of the battery is the power saving level. The person on board can thus be notified by the notification device that the level of the battery is the predetermined level.

A thirteenth aspect is the small planing watercraft according to the twelfth aspect, wherein the processing circuitry determines whether the level of the battery is a warning level which is lower than the power saving level and at which operation of the travel electrical component is destabilized, and the processing circuitry causes the notification device to provide notification of the warning level separately from notification of the power saving level when it is determined that the level of the battery is the warning level. Notification of the warning level can thus be provided separately from notification of the power saving level.

A fourteenth aspect is the small planing watercraft according to the first aspect further including: a travel drive source; and a generation device generating power using power from the travel drive source to charge the battery, wherein the processing circuitry ends control to reduce power consumed by the accessory electrical component when it is determined that the level of the battery is a non-power saving level set to be higher than the power saving level. In this case, due to control to reduce power consumed by the accessory electrical component, the generation device can generate power to charge the battery. When the level is the non-power saving level, control to reduce power consumed by the accessory electrical component ends so that the accessory electrical component can normally be operated.

A small planing watercraft according to a fifteenth aspect includes: an accessory electrical component; a battery supplying power to the accessory electrical component; a sensor detecting a physical quantity corresponding to a level of the battery; a notification device providing recognizable information to a person on board of the small planing watercraft; and processing circuitry determining, based on a result of detection of the sensor, whether the level of the battery is a predetermined power saving level and whether the level of the battery is a warning level which is lower than the power saving level and at which operation of a travel electrical component is destabilized, causing the notification device to provide notification when it is determined that the level of the battery is the predetermined power saving level, and causing the notification device to provide notification of the warning level separately from notification of the power saving level when it is determined that the level of the battery is the warning level.

According to the small planing watercraft, the notification device is caused to provide notification when the level of the battery becomes the predetermined level during operation of the accessory electrical component. The person on board can thus be prompted to take action to reduce consumption of the battery. Notification of the warning level can be provided separately from notification of the power saving level.

A method of controlling a small planing watercraft according to a sixteenth aspect is a method of controlling a small planing watercraft including a travel electrical component driven for travel of the small planing watercraft, an accessory electrical component provided separately from the travel electrical component, and a battery supplying power to the travel electrical component and the accessory electrical component, the method including: detecting a physical quantity corresponding to a level of the battery; determining, based on a result of detection of the physical quantity corresponding to the level of the battery, whether the level of the battery is a predetermined power saving level; and controlling, when it is determined that the level of the battery is the power saving level, operation of the accessory electrical component so that power consumed by the accessory electrical component is less than that before determination.

According to the sixteenth aspect, operation of the accessory electrical component is controlled to reduce power consumed by the accessory electrical component when the level of the battery is the predetermined power saving level. The influence of reduction in level of the battery on travel of the small planing watercraft can thus be suppressed.

The foregoing description is in all aspects illustrative and not restrictive. It is therefore understood that numerous unillustrated modifications can be devised without departing from the scope of the disclosure.

What is claimed is:

1. A small planing watercraft comprising:
a travel electrical component driven for travel of the small planing watercraft;
a starter motor initiating an internal combustion engine as a travel drive source;
an accessory electrical component provided separately from the travel electrical component, the accessory electrical component being an electrical part not affecting travel on water; and
a battery supplying power to the travel electrical component and the accessory electrical component;
a sensor detecting a physical quantity corresponding to a level of the battery;
a generator receiving a portion of the power generated by the internal combustion engine, and generating power to charge the battery, and
processing circuitry
determining, based on a result of detection of the sensor, whether the level of the battery is a predetermined power saving level, and
controlling, when it is determined that the level of the battery is the predetermined power saving level, operation of the accessory electrical component so that power consumed by the accessory electrical component is less than that before determination,
wherein the predetermined power saving level is set to be higher than a level at which the starter motor is operable,
wherein the battery supplies power to the starter motor, after it is determined that the level of the battery is the predetermined power saving level, the battery is charged with power generated by the generator, and when it is determined that the level of the battery is not the predetermined power saving level, control to reduce power consumed by the accessory electrical component is stopped, wherein, even if it is determined that the level of the battery is the predetermined power saving level, the processing circuitry maintains control of the travel electrical component similarly to that before determination of the predetermined power saving level, and wherein the predetermined power saving level is set as a level of the battery insufficient to initiate startup of the internal combustion engine by rotation of the starter motor.

2. The small planing watercraft according to claim 1, wherein the processing circuitry maintains rpm of the internal combustion engine to be the same as that before determination of the predetermined power saving level in a state where the internal combustion engine is maintained in an idling state and the small planing watercraft is stopped moving, even when it is determined that the level of the battery is the predetermined power saving level, and wherein the processing circuitry controls acceleration and deceleration of the travel electrical component based on operation of the operator even when it is determined that the level of the battery is the predetermined power saving level.

3. The small planing watercraft according to claim 1 further comprising:

a travel drive source; and the generator generating power using power from the travel drive source to charge the battery, wherein the processing circuitry stops power supply to the accessory electrical component when the travel drive source is stopped.

4. The small planing watercraft according to claim 1 further comprising a travel drive source, wherein the processing circuitry regularly determines whether the level of the battery is the predetermined power saving level based on the result of detection of the sensor during operation of the travel drive source, and controls, when it is determined that the level of the battery is a predetermined level, operation of the accessory electrical component to reduce power consumed by the accessory electrical component.

5. The small planing watercraft according to claim 1, wherein the processing circuitry controls, when it is determined that the level of the battery is the predetermined power saving level, operation of the accessory electrical component to reduce power consumed by the accessory electrical component while maintaining control of the travel electrical component similarly to that before determination.

6. The small planing watercraft according to claim 1, wherein the accessory electrical component comprises one or more accessory electrical components, and the processing circuitry stops power supply to at least one of the accessory electrical components when it is determined that the level of the battery is the predetermined power saving level.

7. The small planing watercraft according to claim 1, wherein the accessory electrical component comprises accessory electrical components, the small planing watercraft further comprises a switch collectively switching states of power supply from the battery to the accessory electrical components, and the processing circuitry controls the switch to stop power supply to the accessory electrical components when it is determined that the level of the battery is the predetermined power saving level.

8. The small planing watercraft according to claim 1, wherein the accessory electrical component comprises an amplifier supplying a current to a speaker.

9. The small planing watercraft according to claim 8, wherein the processing circuitry performs control to stop power supply to the amplifier when it is determined that the level of the battery is the predetermined power saving level.

10. The small planing watercraft according to claim 8, wherein the processing circuitry causes the amplifier to lower a reproduced sound volume when it is determined that the level of the battery is the predetermined power saving level.

11. The small planing watercraft according to claim 1 further comprising a notification device providing recognizable information to a person on board of the small planing watercraft, and the processing circuitry causes the notification device to provide notification of the predetermined power saving level when it is determined that the level of the battery is the predetermined power saving level.

12. The small planing watercraft according to claim 11, wherein the processing circuitry determines whether the level of the battery is a warning level which is lower than the predetermined power saving level and at which operation of the travel electrical component is destabilized, and the processing circuitry causes the notification device to provide notification of the warning level separately from notification of the predetermined power saving level when it is determined that the level of the battery is the warning level.

13. The small planing watercraft according to claim 1 further comprising:

a travel drive source; and the generator generating power using power from the travel drive source to charge the battery, wherein the processing circuitry ends control to reduce power consumed by the accessory electrical component when it is determined that the level of the battery is a non-power saving level set to be higher than the predetermined power saving level.

14. A method of controlling a small planing watercraft including a travel electrical component driven for travel of the small planing watercraft, a starter motor initiating an internal combustion engine generating propulsion power as a travel drive source, an accessory electrical component provided separately from the travel electrical component, a battery supplying power to the travel electrical component, the accessory electrical component, and the starter motor, and a generator receiving a portion of the power generated by the internal combustion engine, and generating power to charge the battery, the method comprising:

detecting a physical quantity corresponding to a level of the battery;

determining, based on a result of detection of the physical quantity corresponding to the level of the battery, whether the level of the battery is a predetermined power saving level;

controlling, when it is determined that the level of the battery is the predetermined power saving level, operation of the accessory electrical component so that power consumed by the accessory electrical component is less than that before determination, and even when it is determined that the level of the battery is the predetermined power saving level, power supply to the travel electrical component necessary for traveling is maintained;

charging the battery with power generated by the generator when it is determined that the level of the battery is not the predetermined power saving level, and stopping control to reduce power consumed by the accessory electrical component when it is determined that the level of the battery is not the predetermined power saving level, wherein the accessory electrical component is an electrical part not affecting travel on water, wherein the starter motor is a travel electrical component and rotates a crankshaft of the internal combustion engine until a combustion cycle of the internal combustion engine is established, and rotation is stopped when the combustion cycle is established, and wherein the predetermined power saving level (i) is set to be higher than a level of the battery at which the travel electrical component is operable, and (ii) is set as a level of the battery insufficient to initiate startup of the internal combustion engine by rotation of the starter motor.

15. The small planing watercraft according to claim 1, further comprising:

the generator receiving a portion of power generated by the internal combustion engine to charge the battery, and a propulsion stop mechanism stopping propulsion even when the internal combustion engine is running.

16. The small planing watercraft according to claim 1, wherein the processing circuitry causes a notification device to provide notification of a warning level when it is determined that the level of the battery is equal to or lower than the warning level which is set to be greater than the predetermined power saving level.

17. The small planing watercraft according to claim 1, further comprising a notification device providing recognizable information to a person on board the small planing watercraft, wherein (i) the processing circuitry causes the notification device to provide notification of the predetermined power saving level when it is determined that the level of the battery is the predetermined power saving level, and (ii) the processing circuitry does not cause the notification device to provide notification of the predetermined power saving level when it is determined that the level of the battery is out of the predetermined power saving level.

18. The method of controlling the small planing watercraft according to claim 14, further comprising a notification device providing recognizable information to a person on board the small planing watercraft, the notification device (i) providing notification of the predetermined power saving level when it is determined that the level of the battery is the predetermined power saving level, and (ii) not providing notification of the predetermined power saving level when it is determined that the level of the battery is out of the predetermined power saving level.

19. The small planing watercraft according to claim 1, wherein the processing circuitry maintains rpm of the internal combustion engine to be the same as that before determination of the predetermined power saving level in a state where the internal combustion engine is maintained in an idling state and the small planing watercraft is stopped moving.

* * * * *